US012712268B2

(12) United States Patent
Bang

(10) Patent No.: US 12,712,268 B2
(45) Date of Patent: Aug. 18, 2026

(54) ELECTRONIC DEVICE COMPRISING ANTENNA STRUCTURE

(71) Applicant: Samsung Electronics Co., Ltd., Suwon-si (KR)

(72) Inventor: Jungyouel Bang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 18/795,752

(22) Filed: Aug. 6, 2024

(65) Prior Publication Data

US 2024/0396217 A1 Nov. 28, 2024

Related U.S. Application Data

(63) Continuation of application No. PCT/KR2023/004368, filed on Mar. 31, 2023.

(51) Int. Cl.

*H01Q 7/00* (2006.01)
*H01Q 1/27* (2006.01)
*H01Q 1/38* (2006.01)
*H01Q 1/52* (2006.01)

(52) U.S. Cl.

CPC ............... *H01Q 7/00* (2013.01); *H01Q 1/273* (2013.01); *H01Q 1/38* (2013.01); *H01Q 1/526* (2013.01)

(58) Field of Classification Search

CPC ........... H01Q 7/00; H01Q 1/273; H01Q 1/38; H01Q 1/526; H01Q 1/24; H01Q 1/243; H01F 27/36; H02J 50/005; H02J 50/10; H04B 5/43; H04B 5/26

See application file for complete search history.

(56) References Cited

U.S. PATENT DOCUMENTS

| | | | | |
|---|---|---|---|---|
| 10,148,321 | B2 | 12/2018 | Jang et al. | |
| 10,592,893 | B2 | 3/2020 | Lee et al. | |
| 2009/0121955 | A1* | 5/2009 | Kubo | H01Q 7/06 343/788 |
| 2013/0038278 | A1 | 2/2013 | Park et al. | |

FOREIGN PATENT DOCUMENTS

| | | | |
|---|---|---|---|
| CN | 112736412 | A | 4/2021 |
| CN | 113452160 | | 9/2021 |
| JP | 2020167832 | A | 10/2020 |
| KR | 20150054739 | A | 5/2015 |
| KR | 101548277 | B1 | 8/2015 |
| KR | 20170018646 | A | 2/2017 |

(Continued)

OTHER PUBLICATIONS

International Search Report for PCT/KR2023/004368 mailed Jul. 5, 2023, 8 pages.

(Continued)

*Primary Examiner* — David E Lotter
(74) *Attorney, Agent, or Firm* — Nixon & Vanderhye P.C.

(57) ABSTRACT

In an embodiment, this electronic device comprises: a housing forming the exterior of the electronic device; and an antenna structure provided inside the housing, wherein the antenna structure may comprise: a first coil; a second coil located to be adjacent to the first coil so as to overlap the first coil in a region of the first coil; and a first shielding member located between the first coil and the second coil. Various other embodiments can be possible.

13 Claims, 8 Drawing Sheets

(56) References Cited

FOREIGN PATENT DOCUMENTS

| | | | |
|---|---|---|---|
| KR | 10-1735370 | | 5/2017 |
| KR | 20190091238 | A | 8/2019 |
| KR | 101983612 | B1 | 9/2019 |
| KR | 102194806 | B1 | 12/2020 |
| KR | 20220031203 | A | 3/2022 |
| KR | 20220036524 | A | 3/2022 |

OTHER PUBLICATIONS

Written Opinion of the ISA for PCT/KR2023/004368 mailed Jul. 5, 2023, 5 pages.

Extended European Search Report dated Jan. 31, 2025 issued in European Patent Application No. 23718158.1.

* cited by examiner

ELECTRONIC DEVICE COMPRISING ANTENNA STRUCTURE

CROSS-REFERENCE TO RELATED APPLICATIONS

This application is a continuation application of International Application No. PCT/KR2023/004368 designating the United States, filed on Mar. 31, 2023, in the Korean Intellectual Property Receiving Office and claiming priority to Korean Patent Application No. 10-2022-0068142, filed on Jun. 3, 2022 and Korean Patent Application No. 10-2022-0074592, filed on Jun. 20, 2022, in the Korean Intellectual Property Office, the disclosures of which are incorporated by reference herein in their entireties.

BACKGROUND

1. Field

The disclosure relates to an electronic device including an antenna structure.

2. Description of Related Art

Advances within electronics technology have accelerated the development and distribution of various types of electronic products. One example of such electronic products may include electronic devices wearable on the body, otherwise termed wearable electronic devices. The development and distribution of such wearable electronic devices, is likewise accelerating.

Technical Problem

A wearable electronic device may be formed in a relatively small size so as to be easily worn on the body. A wearable electronic device may comprise one or more antennas. The one or more antennas may include a Near Field Communication (NFC) antenna, a Wireless Power Consortium (WPC) antenna, or a Magnetic Secure Transmission (MST) antenna. The NFC antenna may be provided in a chip, or tag, form, and may be mounted on a printed circuit board (PCB) within a wearable electronic device. In particular, owing to the NFC characteristics and size, the NFC antenna may be mounted on an outside (e.g. a bottom surface) of the PCB. However, the size of the chip-formed NFC antenna may constrain the wiring of the PCB at the position where the NFC antenna is installed (or mounted). For example, signal wiring may not be possible in the space surrounding the mounted antenna. Furthermore, the size (i.e. component thickness) of the mounted NFC antenna may result in inefficient utilization of the internal space within the electronic device. For example, the position and size of the mounted NFC antenna may interfere with (or obstruct) surrounding structure, or housing, and as such hinder any reduction in (i.e. decrease) in internal space, and thus reduction in product thickness and/or material cost of a wearable electronic device.

There is a need for an electronic device (i.e. a wearable electronic device) addressing (i.e. solving, mitigating) at least some of the above problems. However, such problems are not limited to those described, and other technical problems not mentioned herein will be clearly understood by those having ordinary knowledge in the art, from the detailed description provided.

SUMMARY

According to an embodiment, an electronic device having an antenna structure in which a first antenna overlaps a second antenna may be provided.

In an embodiment, an electronic device may include a housing configured to form an exterior of the electronic device and an antenna structure provided inside the housing. The antenna structure may comprise a Wireless Power Consortium (WPC) coil (e.g., a coil for a WPC antenna), a Near Field Communication (NFC) coil (e.g., a coil for a NFC antenna) positioned adjacent to the WPC coil to overlap the WPC coil within an area of the WPC coil, and a first shielding member positioned between the WPC coil and the NFC coil.

In an embodiment, an electronic device may include a housing configured to form an exterior of the electronic device and an antenna structure provided inside the housing. The antenna structure may include a WPC coil positioned adjacent to a rear surface of the electronic device, an NFC coil positioned in a front direction of the WPC coil to be adjacent to the WPC coil and overlapping the WPC coil within an area of the WPC coil, a first shield member positioned between the WPC coil and the NFC coil, and a second shielding member positioned in a front direction of the NFC coil.

In an embodiment, an electronic device may include a housing configured to form an exterior of the electronic device and an antenna structure provided inside the housing. The antenna structure may include a first coil, a second coil positioned adjacent to the first coil to overlap the first coil within an area of the first coil, and a first shielding member positioned between the first coil and the second coil. In certain examples, the first coil and the second coil may include or be any two of a WPC coil (e.g., a coil for a WPC antenna), an NFC coil (e.g., a coil for a NFC antenna), and a Magnetic Secure Transmission (MST) coil (e.g., a coil for a MST antenna).

According to various embodiments, the first antenna may overlap (or superimpose thereon) a second antenna, so as to be provided (implemented, or formed) as a combination. The (combined) antenna structure may be provided in a mounting space within the electronic device using a small printed circuit board, PCB, size, and may contribute to reducing product thickness, reducing material cost, and expanding an NFC recognition range to improve usability.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
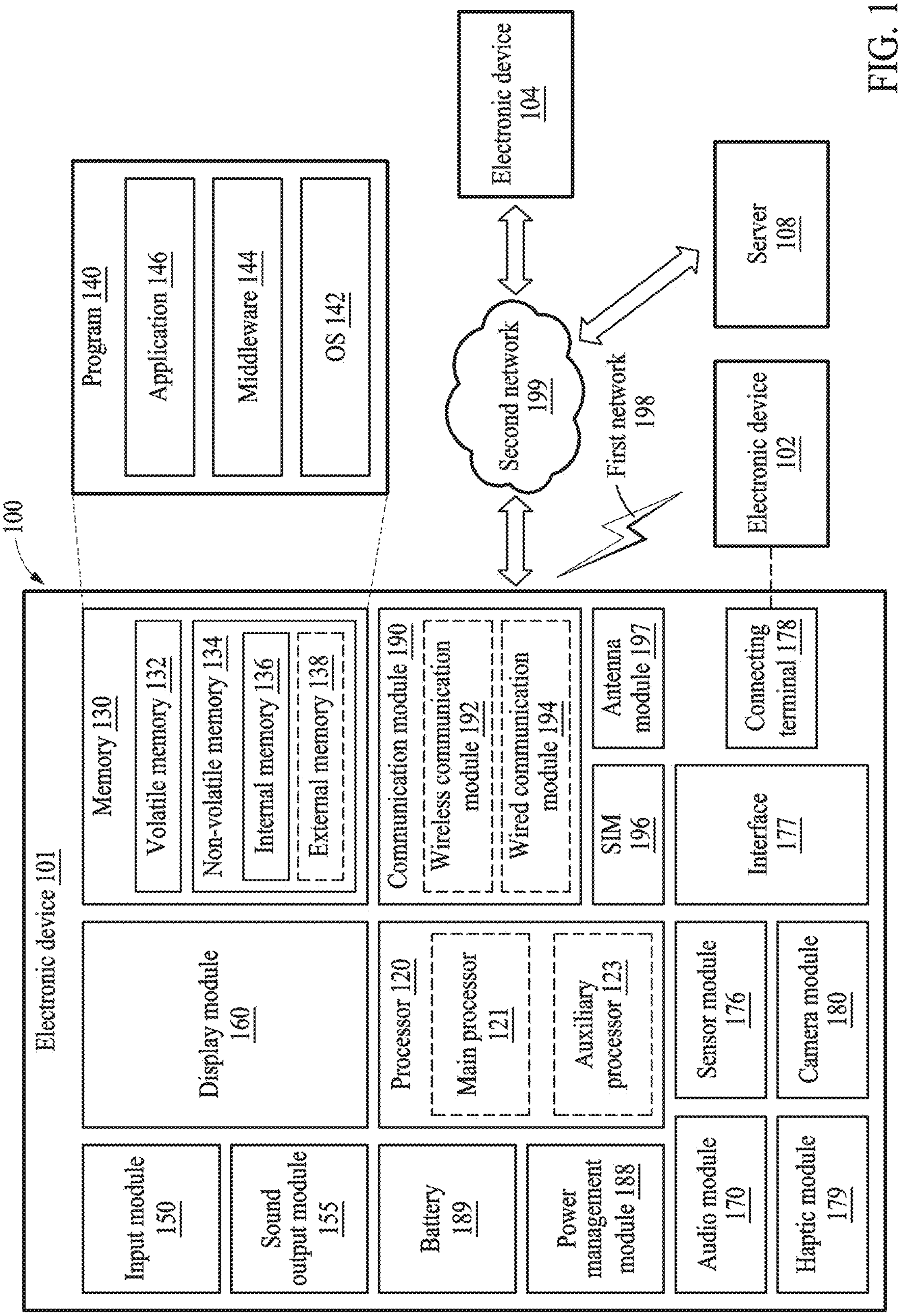
FIG. 1 is a block diagram illustrating an electronic device in a network environment, according to embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal and vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., that is, to or from an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna, from the plurality of antennas, that is appropriate for a communication scheme used in a communication network, such as the first network 198 or the second network 199, may be selected by, for example, the communication module 190. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
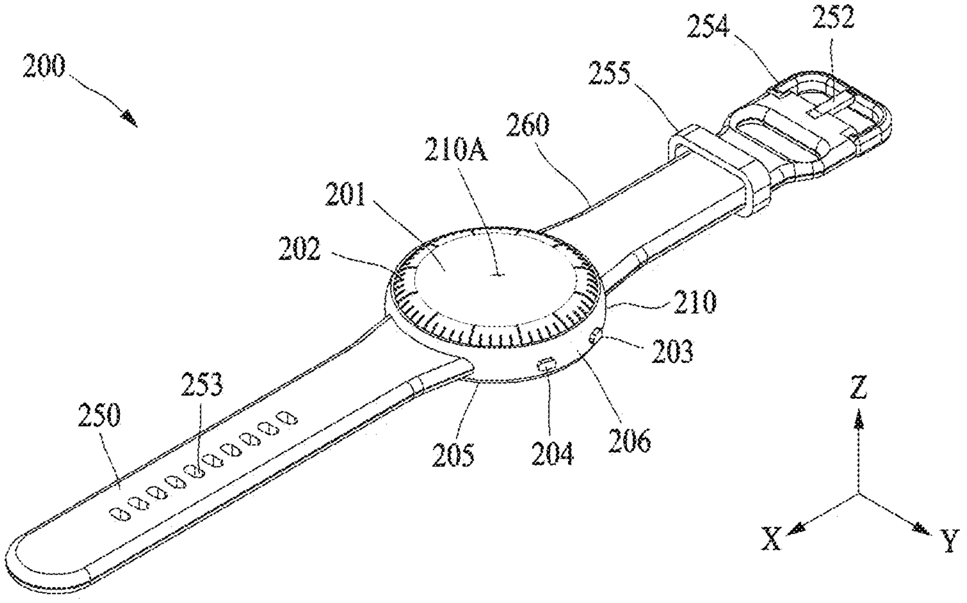
FIG. 2A is a front perspective view of an electronic device according to an embodiment.
Figure 2B:
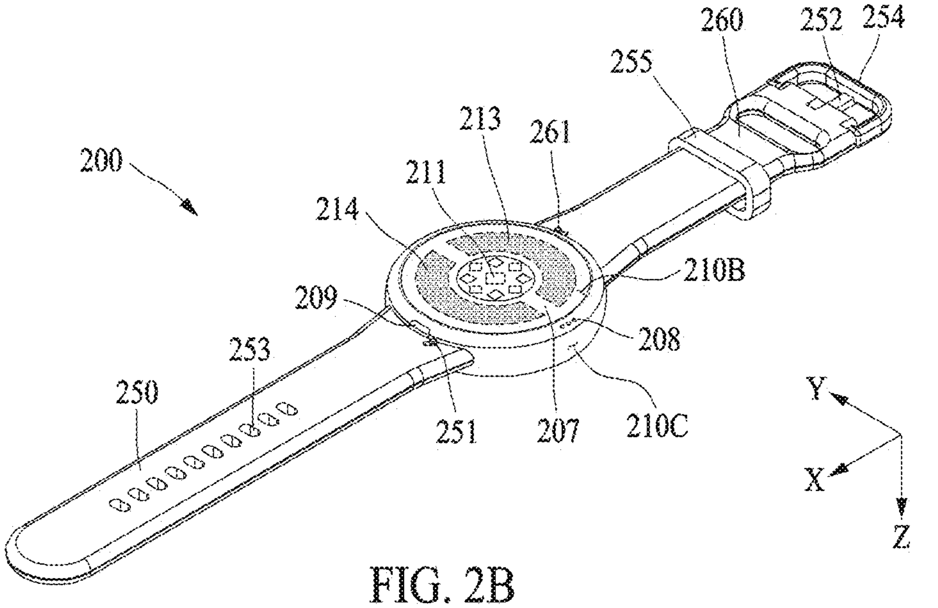
FIG. 2B is a rear perspective view of an electronic device according to an embodiment.

FIG. 2A is a front perspective view of an electronic device according to an embodiment. FIG. 2B is a rear perspective view of the electronic device according to an embodiment.

Referring to FIGS. 2A and 2B, according to an embodiment, an electronic device 200 (e.g., the electronic device 101 of FIG. 1) may include a housing 210 including a first surface (or front surface) 210A, a second surface (or back surface) 210B, and a side surface 210C surrounding a space between the first surface 210A and the second surface 210B, and fastening members 250 and 260 connected to at least a portion of the housing 210 and configured to detachably attach the electronic device 200 to a body part (e.g., the wrist, ankle, etc.) of a user. In an embodiment (not shown), the housing may also refer to a structure which forms a portion of the first surface 210A, the second surface 210B, and the side surface 210C of FIG. 2A. According to an embodiment, the first surface 210A may be formed by a front plate 201 (e.g., a glass plate or a polymer plate including various coating layers) of which at least a portion is substantially transparent. The second surface 210B may be formed by a rear plate 207 that is substantially opaque. The rear plate 207 may be formed of, for example, coated or colored glass, ceramic, polymer, metal (e.g., aluminum, stainless steel (STS), or magnesium), or a combination of at least two thereof. The side surface 210C may be coupled to the front plate 201 and the rear plate 207 and may be formed by a side bezel structure (or a "side member") 206 including a metal and/or a polymer. In an embodiment, the rear plate 207 and the side bezel structure 206 may be integrally formed and may include the same material (e.g., a metal material, such as aluminum). The fastening members 250 and 260 may be formed of various materials and may have various shapes for detachably attaching the electronic device 200 to the body part of the user. For example, the fastening members 250 and 260 may be formed of woven fabric, leather, rubber, urethane, metal, ceramic, or a combination of at least two of the aforementioned materials and may be implemented in an integrated form or with a plurality of unit links that are movable relative to each other.

According to an embodiment, the electronic device 200 may include at least one of a display (e.g., a display 330 of FIG. 3), audio modules 205 and 208, a sensor module 211, key input devices 202, 203, and 204, and a connector hole 209. In an embodiment, the electronic device 200 may not include at least one (e.g., the key input devices 202, 203, and 204, the connector hole 209, or the sensor module 211) of the components, or additionally include other components.

The display 330 may be exposed through, for example, one or more portions of the front plate 201. The display 330 may have a shape corresponding to a shape of the front plate 201 and may have other shapes such as a circle, an oval, or a polygon. The display 330 may be coupled to or disposed adjacent to a touch sensing circuit, a pressure sensor capable of measuring an intensity (or pressure) of a touch, and/or a fingerprint sensor.

The audio modules 205 and 208 may include a microphone hole 205 and a speaker hole 208. A microphone for acquiring external sound may be disposed in the microphone hole 205. In some embodiments, a plurality of microphones may be disposed to detect a direction of sound. The speaker hole 208 may be used as an external speaker and a call receiver for calls. In an embodiment, the speaker hole 208 and the microphone hole 205 may be implemented as a single hole, or a speaker (e.g., a piezo speaker) may be included without the speaker hole 208.

The sensor module 211 may generate an electrical signal or a data value corresponding to an internal operating state of the electronic device 200 or an external environmental state. The sensor module 211 may include, for example, a biosensor module 211 (e.g., a Heart Rate Monitor (HRM) sensor) disposed on the second surface 210B of the housing 210. The electronic device 200 may further include at least one of sensor modules (not shown), for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The sensor module 211 may include electrode areas 213 and 214 that form a portion of the surface of the electronic device 200 and a biosignal detection circuit (not shown) electrically connected to the electrode areas 213 and 214. For example, the electrode areas 213 and 214 may include a first electrode area 213 and a second electrode area 214 disposed on the second surface 210B of the housing 210. The sensor module 211 may be configured such that the electrode areas 213 and 214 obtain an electrical signal from a body part of the user, and the biosignal detection circuit detects biometric information of the user based on the electrical signal.

The key input devices 202, 203, and 204 may include a wheel key 202 disposed on the first surface 210A of the housing 210 and rotatable in at least one direction, and/or side key buttons 203 and 204 disposed on the side surface 210C of the housing 210. The wheel key 202 may have a shape corresponding to the shape of the front plate 201. In an embodiment, the electronic device 200 may not include some or all of the key input devices 202, 203, and 204 described above, and the key input devices 202, 203, and 204 that are not included may be implemented in other forms such as soft keys on the display 330. The connector hole 209 may include another connector hole (not shown) that accommodates a connector (e.g., a USB connector) for transmitting and receiving power and/or data to and from an external electronic device and accommodates a connector for transmitting and receiving an audio signal to and from an external electronic device. The electronic device 200 may further include, for example, a connector cover (not shown) that covers at least a portion of the connector hole 209 and blocks infiltration of external foreign materials into the connector hole 209.

The fastening members 250 and 260 may be detachably fastened to at least a partial area of the housing 210 using locking members 251 and 261. The fastening members 250 and 260 may include one or more of a fixing member 252, a fixing member fastening hole 253, a band guide member 254, and a band fixing ring 255.

The fixing member 252 may be configured to fix the housing 210 and the fastening members 250 and 260 to a part (e.g., the wrist, ankle, etc.) of the user's body. The fixing member fastening hole 253 may correspond to the fixing member 252 to fix the housing 210 and the fastening members 250 and 260 to the part of the user's body. The band guide member 254 may be configured to limit a range of a movement of the fixing member 252 when the fixing member 252 is fastened to the fixing member fastening hole 253, so that the fastening members 250 and 260 may be fastened to the part of the user's body when brought into close contact with the part of the user's body. The band fixing ring 255 may limit a range of a movement of the fastening members 250 and 260 in a state in which the fixing member 252 and the fixing member fastening hole 253 are fastened with each other.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B,", "A and/or B", "at least one of A and B,", "at least one of A or B,", "A, B or C,", "A, B and/or C", "at least one of A, B and C," and "at least one of A, B, or C," each of which may include any one of the items listed together in the corresponding one of the phrases, or all possible combinations thereof. Terms such as "$1^{st}$," "$2^{nd}$," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3A:
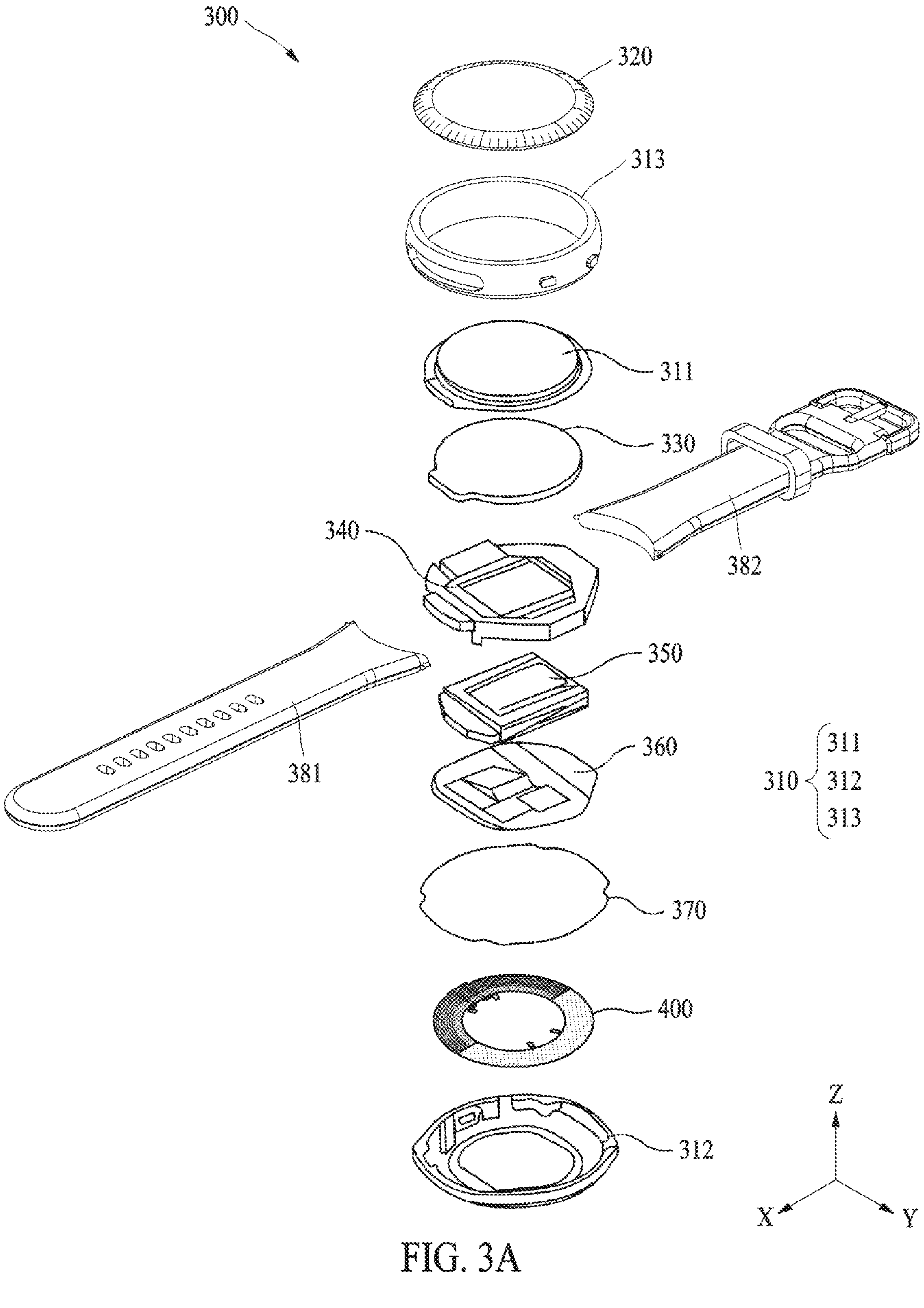
FIG. 3A is an exploded perspective view of an electronic device according to an embodiment.
Figure 3B:
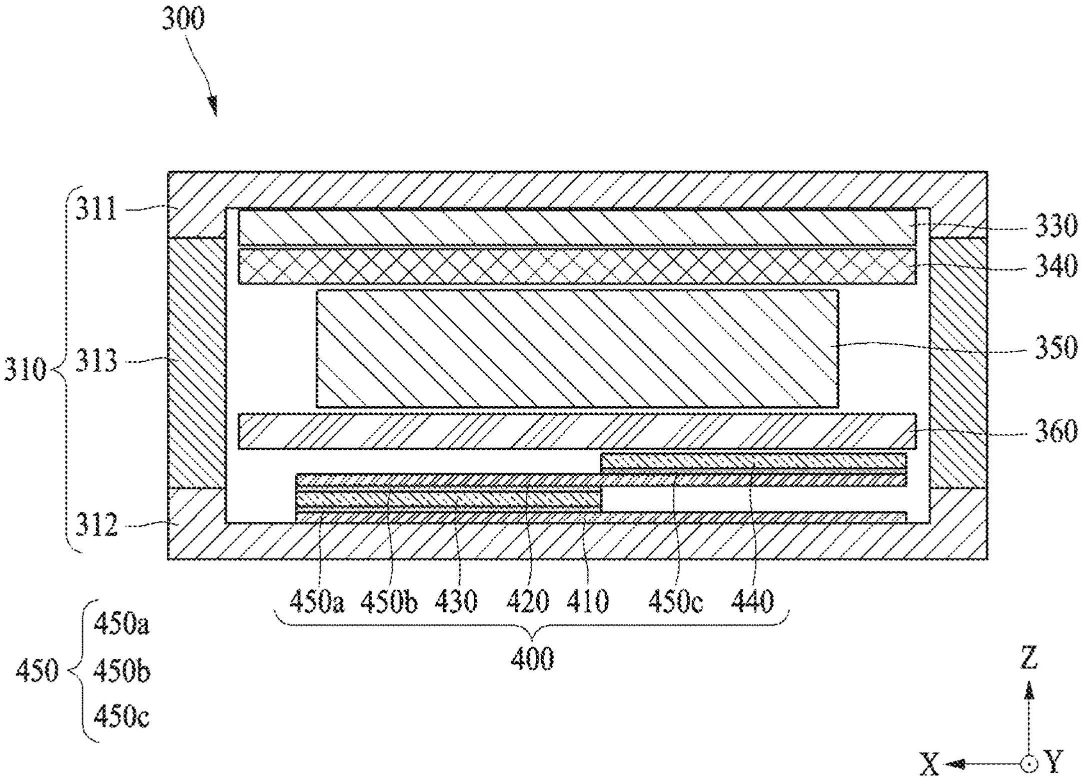
FIG. 3B is a cross-sectional view of an electronic device according to an embodiment, schematically illustrating the inside of the electronic device.

FIG. 3A is an exploded perspective view of an electronic device according to an embodiment. FIG. 3B is a cross-sectional view of an electronic device according to an embodiment, schematically illustrating the inside of the electronic device.

Referring to FIGS. 3A and 3B, an electronic device 300 according to an embodiment may be a wearable device detachable from a part of a/the body of a user. The electronic device 300 (e.g., the electronic device 101 of FIG. 1 or the electronic device 200 of FIG. 2A) according to an embodiment may include a housing 310 (e.g., the housing 210 of FIG. 2A), a wheel key 320 (e.g., the wheel key 202 in FIG. 2A), the display 330, a support member 340 (e.g., a bracket), a battery 350, a PCB 360, a sealing member 370, fastening members 381 and 382 (e.g., the fastening members 250 and 260 of FIG. 2A), and/or an antenna structure 400 (e.g., the antenna module 197 of FIG. 1). One or more components of the electronic device 300 may be the same as or similar to one or more components of the electronic device 101 of FIG. 1 or the electronic device 200 of FIG. 2, and thus, a repeated description thereof is omitted here.

In an embodiment, the housing 310 may form at least a portion of the exterior of the electronic device 300. For example, the housing 310 may include a front plate 311 (e.g., the front plate 201 of FIG. 2A), a rear plate 312 (e.g., the rear plate 207 of FIG. 2B), and a side bezel structure 313 (e.g., the side bezel structure 206 of FIG. 2A). A space for disposing other components may be formed inside the housing 310. For example, the inside of the housing 310 may accommodate the display 330, the support member 340, the battery 350, the PCB 360, the sealing member 370, and/or the antenna structure 400. However, it will be apparent that this is non-limiting, and it will be appreciated that further components to those listed may be additionally be disposed inside the housing 310. Furthermore one or more of the components may be disposed outside the housing 310.

In an embodiment, the wheel key 320 may be disposed on the outer front surface (e.g., a surface in the +z direction) of the housing 310. The wheel key 320 may be rotatable in at least one direction.

In an embodiment, the display 330 may display visual information to the outside. The display 330 may be disposed toward a front surface (e.g., a surface in the +z direction) of the electronic device 300 and thus visually exposed through at least a portion of the front plate 311.

The support member 340 may be disposed inside the electronic device 300 and may be connected to the side bezel structure 313 or may be integrally formed with the side bezel structure 313. The support member 340 may be formed of, for example, a metal material and/or a non-metal material (e.g., polymer). Other components may be arranged and supported on the support member 340. For example, the display 330 may be on one surface (e.g., a surface in the +z direction) of the support member 340.

In an embodiment, the battery 350 may supply power to one or more components of the electronic device 300. For example, the battery 350 may include a primary battery, a secondary battery, or a fuel cell. The battery 350 may be formed integrally inside the electronic device 300, or disposed so as to be detachable (e.g., removable) from the electronic device 300. For example, the battery 350 may be in the rear direction (e.g., the −z direction, or positioned underneath) of the support member 340. However, this is only an example and the position of the battery 350 is not limited thereto. For example, at least a portion of the battery 350 may be positioned, on substantially the same plane as the PCB 360.

The PCB 360 may be provided with a processor, a memory, and/or an interface mounted thereon. The processor may include, for example, one or more of a CPU, an AP, a GPU, a sensor processor, or a CP. The memory may include, for example, a volatile memory or a non-volatile memory. The interface may include, for example, an HDMI interface, a USB interface, an SD card interface, or an audio interface. For example, the interface may electrically or physically connect the electronic device 300 to an external electronic device, and may include a USB connector, an SD card/multimedia card (MMC) connector, or an audio connector. The PCB 360 may be positioned in a rear direction (e.g., the −z direction) of the display 330, support member 340, and/or the battery 350. That is, in an example, as viewed from a front surface, the PCB may be positioned underneath the battery 350. In another example, at least a portion of the battery 350 may be positioned on substantially the same plane as the PCB 350.

The sealing member 370 may be between the side bezel structure 313 and the rear plate 312. The sealing member 370 may be configured to prevent moisture and foreign materials from being introduced into a space surrounded by the side bezel structure 313 and the rear plate 312 from the outside.

In an embodiment, the antenna structure 400 may be disposed or positioned closer (i.e. in terms of distance, or a number of structural layers of the electronic device 300) to a rear surface (e.g., a surface in the −z direction) of the electronic device 300 than a front surface (e.g., a surface in the +z direction) of the electronic device 300. The antenna structure 400 may be disposed or positioned between the PCB 360 and the rear plate 312. In an example, the antenna structure may be disposed or positioned adjacent to (or next to) the rear plate 312. The antenna structure 400 may perform one or more functions. For example, the antenna structure 400 may perform short-range communication with an external device, wirelessly transmit and receive power used for charging, or transmit a magnetism-based signal including a short-range communication signal or payment data.

FIGS. 4A to 4D are plane views illustrating a process of forming an antenna structure, according to an embodiment. According to various examples, the antenna structure 400 may be housed in (or comprised within) an electronic device (e.g. electronic device 101 of FIG. 1, electronic device 200 of FIG. 2, or electronic device 300 of FIG. 3).

Referring to FIGS. 3A to 4D, the antenna structure 400 according to an embodiment may comprise a first and second coil. According to an example, as described below, a first coil may be a Wireless Power Consortium (WPC) coil 410 and a second coil may be a Near Field Communication (NFC) coil 420. However, in other examples, one of the first coil or second coil may be an MST coil. The antenna structure 400 may further comprise a first shielding member 430, a second shielding member 440, and/or an adhesive member 450.

In an embodiment, the WPC coil 410 may be an antenna radiator for wirelessly transmitting and receiving power required for charging. For example, the WPC coil 410 may be in the form of a coil wound in a circumferential direction. When a user places the electronic device 300 on a charging cradle and thus a rear surface (e.g., a surface in the −z direction) of the electronic device 300 faces the charging cradle, the WPC coil 410 may be adjacent to the rear surface (e.g., a surface in the −z direction) of the electronic device 300. For example, the WPC coil 410 may be positioned between the PCB 360 and the rear plate 312, and in some examples may be next to, i.e. adjacent to or in proximity to, the rear plate 312.

In an embodiment, the NFC coil 420 may be an antenna radiator for short-range communication with an external device. The NFC coil 420 may be adjacent or in proximity to the WPC coil 410. Herein and throughout the description, adjacent may mean directly adjacent, or may include a space and/or at least one further support layer, or member, between the NFC and WPC coils (or whichever components are being described as being adjacent), to improve configuration and utilization thereof. For example, the NFC coil 420 may be positioned between the PCB 360 and the rear plate 312 along with (i.e. in addition to) the WPC coil 410. The NFC coil 420 may be positioned between the PCB 360 and the WPC coil 410. For example, the WPC coil 410 may be positioned closer (e.g. in terms of distance, or a number of structural layers of the electronic device 300) to the rear surface (e.g., a surface in the −z direction), or the rear plate 312, of the electronic device 300 than the NFC coil 420. In other words, the WPC coil 410 may be positioned below the NFC coil 420 when viewed from a front, or upper, surface of the electronic device 300. However, this is merely exemplary, and in another example, the NFC coil 420 may be positioned closer to a rear surface (e.g., a surface in the −z direction), e.g. the rear plate 312, of the electronic device 300 than the WPC coil 410. In an example, a separation distance (e.g., a distance in the z direction) between the NFC coil 420 and the WPC coil 410 (such as when positioned, or located, in any of the arrangements or positioned detailed in the above examples) may be in the region of about 10 μm to about 1000 μm. However, this is an example, and the separation distance (e.g., a distance of the z direction) between the NFC coil 420 and the WPC coil 410 is not limited thereto.

In an embodiment, the NFC coil 420 may have a coil shape wound in a circumferential direction. Based on a view from the +z direction (i.e. when considered from a top-down view), at least a portion of the NFC coil 420 may overlap the WPC coil 410 within an area of (or formed by) the WPC coil 410. That is, based on a view from the +z direction, at least a portion of the NFC coil 420 may be positioned within the area of the WPC coil 410.

In some examples, the NFC coil may wholly overlap the WPC coil, such that the area of the WPC coil, when viewed from the +z direction, does not extend beyond an area of the NFC coil. In some examples, the NFC coil may only partially overlap the WPC coil, such that at least a portion (or area) of the WPC coil is not covered (or overlapped) by the NFC coil when viewed from the +z direction.

Here, the area of the WPC coil 410 may refer to an area (or portion) of the coil extending from a center of the WPC coil 410 to the maximum (i.e. outer) diameter of the WPC coil 410. In an example, the WPC coil 410 and the NFC coil 420 may be positioned with their respective centers overlapping (or substantially overlapping) each other, and the maximum diameter of the NFC coil 420 may be less than or equal to the maximum diameter of the WPC coil 410. The minimum (i.e. inner) diameter of the NFC coil 420 may be greater than or equal to the minimum diameter of the WPC coil 410, but the minimum diameter of the NFC coil 420 is not limited thereto.

In an embodiment, the WPC coil 410 may include a WPC contact portion 411. The WPC coil 410 may be electrically connected to the PCB 360 through the WPC contact portion 411. In an example, the WPC contact portion 411 may be provided as a pair, e.g. a pair of contact points (or portions). Since the WPC coil 410 is in a more rearward direction (e.g., the −z direction), that is, closer to a rear plate 312 of the electronic device 300 than the NFC coil 420 in the example, the WPC contact portion 411 may extend (e.g., and be contactable) outside the area (or plane) of the WPC coil 410 in order to electrically connect the WPC coil 410 to the PCB 360. For example, the WPC contact portion 411 may extend from the WPC coil 410 and outwards of the diameter of the WPC coil 410. However, this is only an example, and the position and/or the number of the WPC contact points 411 is not limited thereto.

In an embodiment, the NFC coil 420 may include an NFC contact portion 421. The NFC coil 420 may be electrically connected to the PCB 360 through the NFC contact portion 421. For example, the NFC contact portion 421 may be provided as a pair, e.g., a pair of NFC contact points (or portions). The NFC contact portion 421 may be inside the area (or plane) of the NFC coil 420. For example, the NFC contact portion 421 may extend from the coil portion of the NFC coil 420 and toward an inside of the area of the NFC coil 420. However, this is only an example, and the position and/or the number of the NFC contact portions 421 is not limited thereto.

In an embodiment, the first shielding member 430 and/or the second shielding member 440 may be arranged to block one or more signals introduced from outside (e.g. externally to the electronic device). The first shielding member 430 and/or the second shielding member 440 (e.g. by the arrangement or position of the first shielding member 430 and/or the second shielding member 440) may reflect signals generated from the WPC coil 410 and/or the NFC coil 420. For example, the first shielding member 430 and/or the second shielding member 440 may concentrate signals generated by the WPC coil 410 and/or the NFC coil 420 in a designated direction and reduce signal attenuation by surrounding metals, to thus substantially amplify the signals generated from the WPC coil 410 and/or the NFC coil 420. For example, at least one of the first shielding member 430 and the second shielding member 440 may include ferrite.

In an embodiment, the first shielding member 430 may be positioned between the WPC coil 410 and the NFC coil 420. For example, the first shielding member 430 may be in a front direction (e.g., the +z direction) with respect to the WPC coil 410 and in a rear direction (e.g., the −z direction) with respect to the NFC coil 420. In an embodiment, the second shield member 440 may be in a front direction (e.g., the +z direction) of the NFC coil 420, so that the NFC coil 420 may be between the WPC coil 410 and the second shield member 440. For example, the second shielding member 440 may be in a front direction (e.g., the +z direction) with respect to both the WPC coil 410 and the NFC coil 420.

In an embodiment, the first shielding member 430 and/or the second shielding member 440 may be formed in the circumferential direction of the WPC coil 410 and/or the NFC coil 420 (e.g. in a corresponding circumferential shape). For example, the first shielding member 430 and/or the second shielding member 440 may be substantially arc-shaped or fan-shaped. For example, the center of the first shielding member 430 and/or the second shielding member 440 may overlap the center of the WPC coil 410 and/or the NFC coil 420. For example, the maximum diameter (e.g., outer diameter) of the first shielding member 430 and/or the second shielding member 440 may be greater than or equal to the maximum diameter (e.g., outer diameter) of the WPC coil 410 and/or the NFC coil 420. In another example, the minimum diameter (e.g., inner diameter) of the first shielding member 430 and/or the second shielding member 440 may be less than or equal to the minimum diameter (e.g., inner diameter) of the WPC coil 410 and/or the NFC coil 420. However, this is only an example, and the shape of the first shielding member 430 and/or the second shielding member 440 is not limited thereto.

In an embodiment, the first shielding member 430 and the second shielding member 440 may be positioned, or configured, so as not to substantially overlap each other. For example, from a view in the +z direction (i.e. from above), the second shielding member 440 may not overlap the first shielding member 430. For example, referring to FIG. 3B, the first shielding member 430 may be in a left area (e.g., an area in the +x direction) of the WPC coil 410 and the NFC coil 420, and the second shielding member 440 may be in a right area (e.g., an area in the −x direction) of the WPC coil 410 and the NFC coil 420. However, this is only an example, and the position of the first shielding member 430 and/or the second shielding member 440 is not limited thereto.

In an embodiment, the adhesive member 450 may adhere the first shielding member 430 and/or the second shielding member 440 to the WPC coil 410 and/or the NFC coil 420. For example, one surface (e.g., a surface in the −z direction) of the first shielding member 430 may be adhered to the WPC coil 410 by a first adhesive member 450*a*. For example, the other surface (e.g., a surface in the +z direction) of the first shielding member 430 may be adhered to the NFC coil 420 by a second adhesive member 450*b*. For example, one surface (e.g., a surface in the −z direction) of the second shielding member 440 may be adhered to the NFC coil 420 by a third adhesive member 450*c*. However, this is only an example, and the position and/or the number of the adhesive members 450 is not limited thereto. For example, either the first adhesive member 450*a* or the second adhesive member 450*b* may be omitted. Alternatively, the first shielding member 430 and/or the second shielding member 440 may be attached to a structure other than the WPC coil 410 and the NFC coil 420. In another example, the first shielding member 430 and/or the second shielding member 440 themselves may have an adhesive property to thus be attached to the WPC coil 410 and/or the NFC coil 420 without a separate adhesive member.

In an embodiment, since the WPC coil 410 and the NFC coil 420 are positioned to overlap each other, the antenna structure 400 may have a relatively small size. For example, compared to a case where the antenna structure is chip-shaped, the antenna structure 400 according to various examples of the disclosure may be formed with a relatively low, or small, height (e.g., a height in the z direction), owing to the overlapping structure. Accordingly, the internal space of the electronic device 300 in which the antenna structure 400 is disposed may be efficiently utilized, and improved miniaturization (e.g., thickness reduction) of the electronic device 300 may be achieved.

Hereinafter, a process of forming the antenna structure 400 according to an embodiment is described with reference to FIGS. 4A to 4D. The antenna structure 400 may be housed in (or comprised within) an electronic device (e.g. electronic device 101 of FIG. 1, electronic device 200 of FIG. 2, or electronic device 300 of FIG. 3).

Figure 4A:
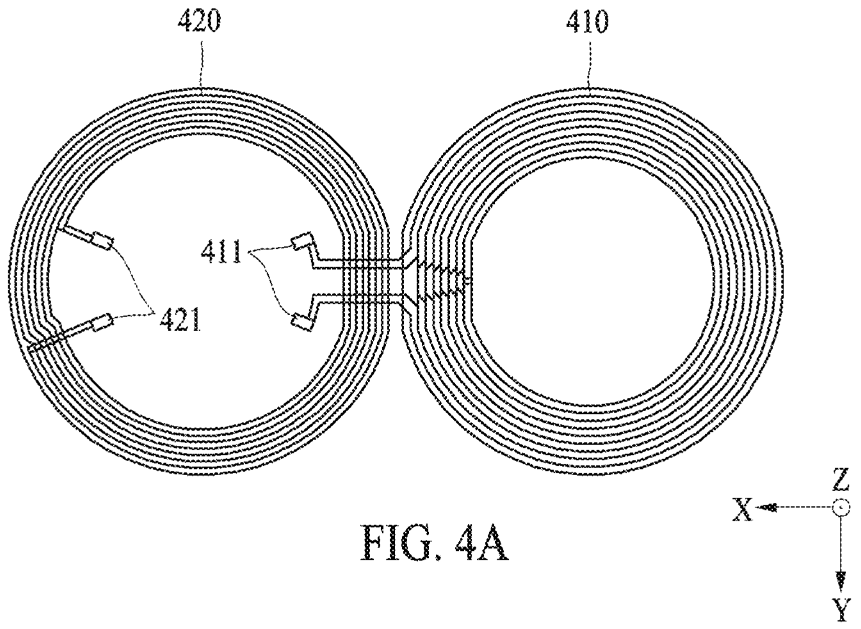
FIGS. 4A, 4B, 4C, and 4D are plan views illustrating a process of forming an antenna structure, according to an embodiment.
Figure 4B:
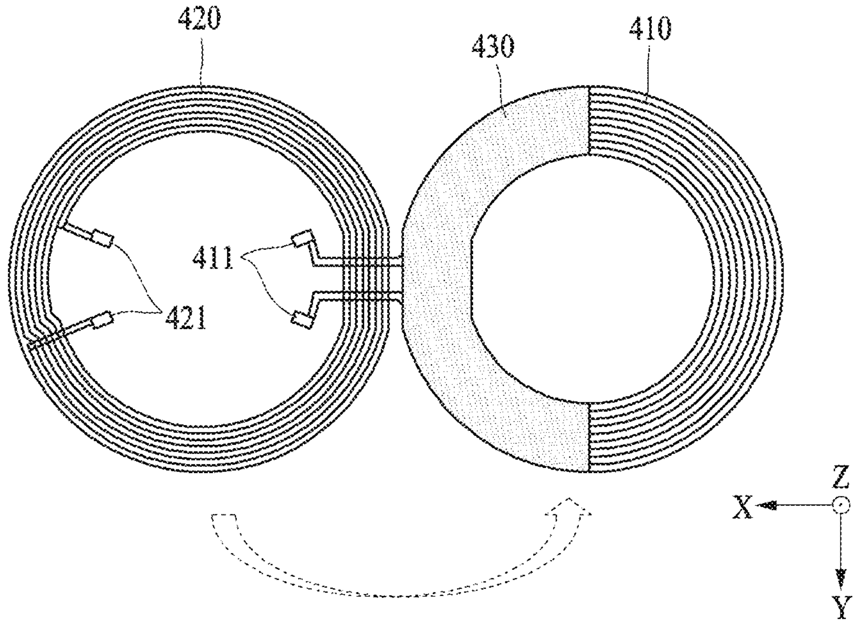
Figure 4C:
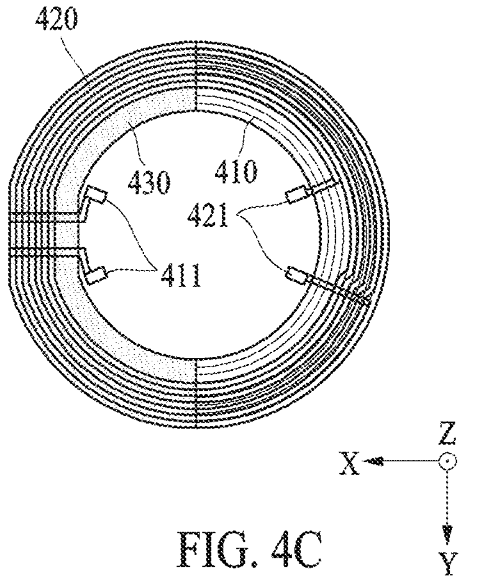
Figure 4D:
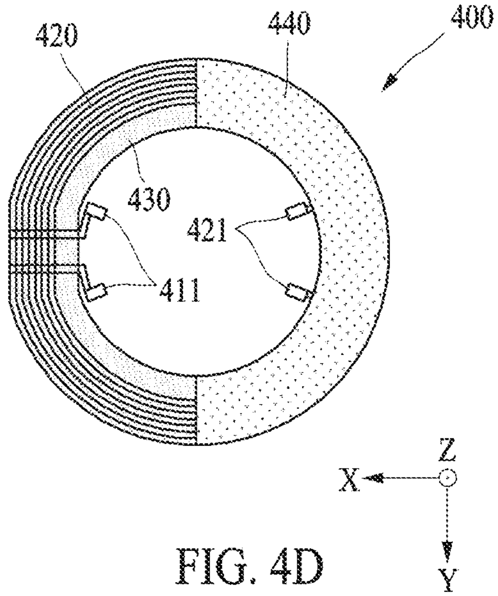

In an embodiment, as shown in FIG. 4A, a first and second coil, such as a WPC coil 410 and the NFC coil 420 may be provided. For example, each of the WPC coil 410 and the NFC coil 420 may be individually formed on a substrate, as shown in FIG. 4A. For example, in the state of FIG. 4A, the WPC contact portion 411 of the WPC coil 410 may be outside the area of the WPC coil 410 (e.g., extending from the WPC coil 410 to within an area of the NFC coil 420), and the NFC contact portion 421 of the NFC coil 420 may be within the area of the NFC coil 420. As shown in FIG. 4B, the first shielding member 430 may be attached to one area, or portion, (e.g., an area in the +x direction) of the WPC coil 410. As shown in FIG. 4C, which illustrates a folded position of the substrate to form the antenna structure 400, the NFC coil 420 may at least partially, or substantially, overlap the WPC coil 410. For example, the center of the NFC coil 420 may substantially, or wholly, overlap the center of the WPC coil 410, and the NFC coil 420 may be positioned within the area of the WPC coil 410. As shown in FIG. 4D, the second shielding member 440 may be attached to one area, or portion, (e.g., an area of the −x direction) of the NFC coil 420. In this case, the second shielding member 440 may not substantially overlap the first shielding member 430. In another example, the second shielding member may not overlap, or cover, any portion of the first shielding member 430. However, this is only an example, and the process of forming the antenna structure 400 according to an embodiment is not limited thereto. In the examples described, the antenna structure 400 may be formed in a manner that the WPC coil 410 and the NFC coil 420 are formed on one substrate (or PCB) that is subsequently folded such that the WPC coil 410 may overlap the NFC coil 420 (as illustrated by FIGS. 4A-4C).

Figure 5A:
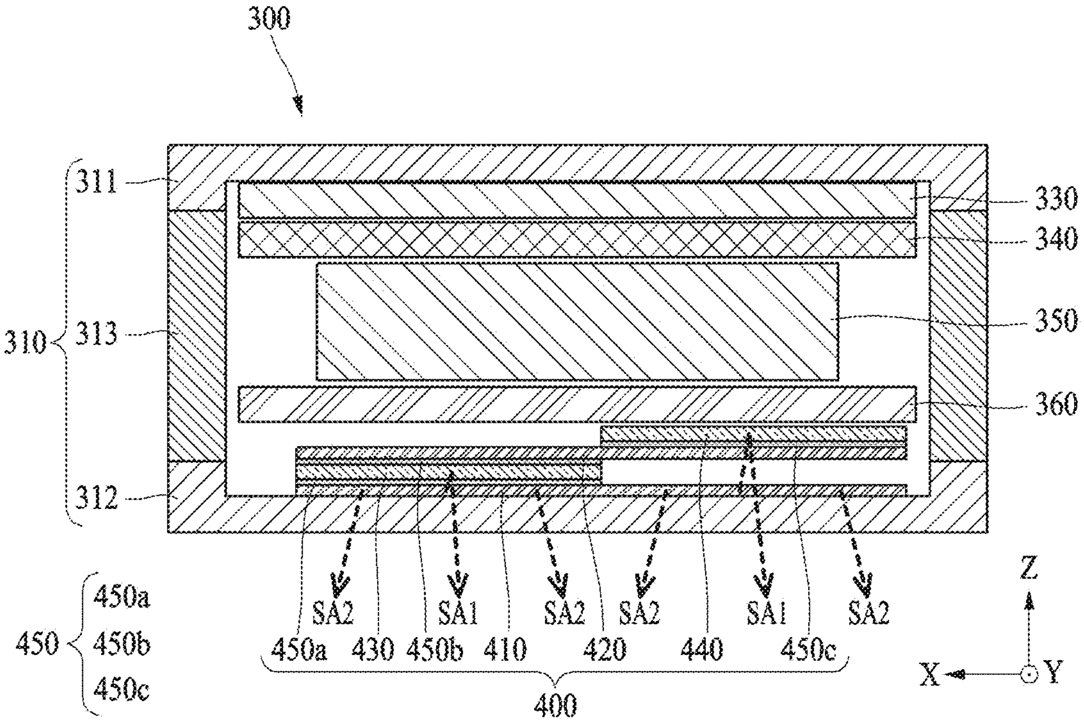
FIG. 5A schematically illustrates an emission direction of a signal generated from a Wireless Power Consortium (WPC) coil in an electronic device, according to an embodiment.
Figure 5B:
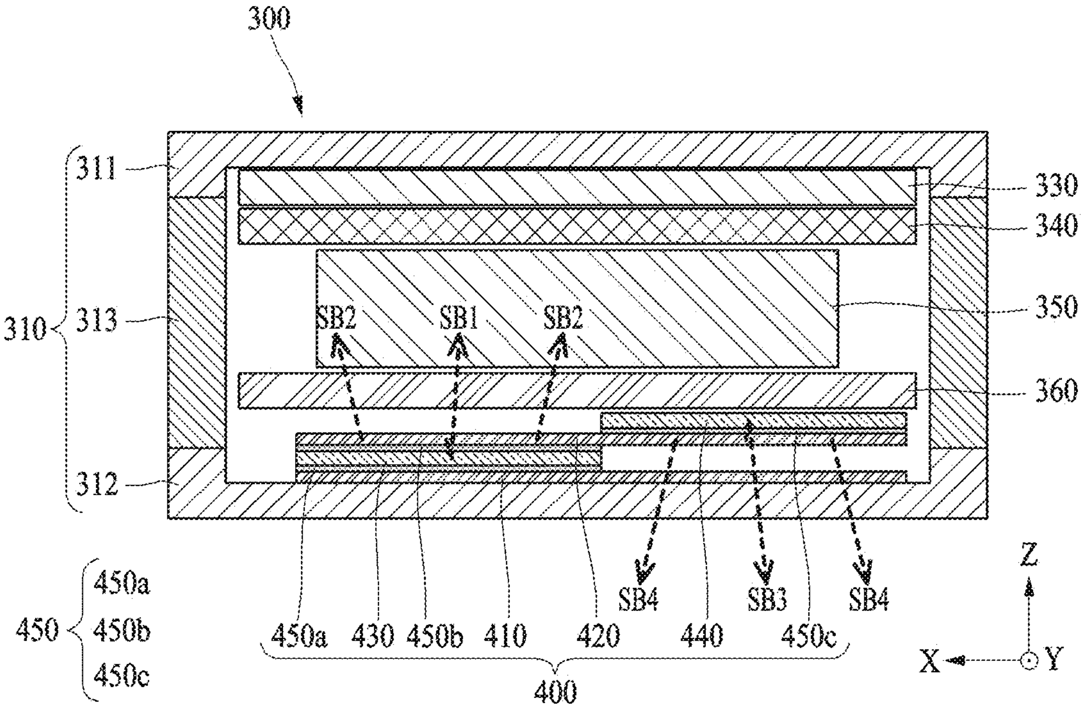
FIG. 5B schematically illustrates an emission direction of a signal generated from a Near Field Communication (NFC) coil in an electronic device, according to an embodiment.

FIG. 5A schematically illustrates an emission direction of a signal generated from a WPC coil in an electronic device according to an embodiment. FIG. 5B schematically illustrates an emission direction of a signal generated from an NFC coil in an electronic device, according to an embodiment. The electronic device may be electronic device 101 of FIG. 1, electronic device 200 of FIG. 2, and/or electronic device 300 of FIG. 3.

In an embodiment, referring to FIG. 5A, the first shielding member 430 and the second shielding member 440 may reflect, toward a rear surface (e.g., the −z direction) of the electronic device 300, a signal SA1 emitted from the WPC coil 410 toward a front surface (e.g., the +z direction) of the electronic device 300. According to such a configuration, the signal SA1 and a signal SA2 generated by the WPC coil 410 may mainly be toward (e.g., directed toward) a rear surface of the electronic device 300 (e.g., the −z direction). When a user places the electronic device 300 on a charging cradle and thus a rear surface (e.g., a surface in the −z direction) of the electronic device 300 faces the charging cradle, the signals SA1 and SA2 generated from the WPC coil 410 may be directed toward the rear side (e.g., the −z direction) of the electronic device 300, thereby improving wireless charging efficiency. In addition, the emission direction of the signals SA1 and SA2 shown in FIG. 5A is only an example, and the emission direction of signals generated by the WPC coil 410 is not limited to the direction shown in FIG. 5A.

In an embodiment, referring to FIG. 5B, the first shielding member 430 may reflect, toward a front surface (e.g., the +z direction) of the electronic device 300, a signal SB1 emitted from the NFC coil 420 toward a rear surface (e.g., the −z direction) of the electronic device 300. The second shielding member 440 may reflect, toward a rear surface (e.g., the −z direction) of the electronic device 300, a signal SB3 emitted from the NFC coil 420 toward a front surface (e.g., the +z direction) of the electronic device 300. According to such a configuration, the signals SB1 and SB3 and signals SB2 and SB4 generated by the NFC coil 420 may be directed towards various directions of the electronic device 300. The signals SB1, SB2, SB3, and SB4 generated from the NFC coil 420 may be directed toward various directions of the electronic device 300, so that the user may effectively utilize the NFC function in any direction where the electronic device 300 approaches a target position. Such a configuration may improve the recognition range of the NFC coil 420 and improve user convenience. For example, in the electronic device 300 including an antenna structure (e.g., the antenna structure 400 of FIG. 3B) according to an embodiment, it is confirmed that the recognition range of the NFC signal is about (e.g., extends to) 50 mm or more in not only a front direction (e.g., the +z direction) of the electronic device 300 but all directions (e.g., −y, +y, −x, and +x directions) of the electronic device 300. However, such a range is intended as exemplary, and in some examples, may extend beyond this range in one or more directions. However, the emission directions of the signals SB1, SB2, SB3, and SB4 shown in FIG. 5B are only an example, and the emission directions of signals generated from the NFC coil 420 are not limited to the directions shown in the FIG. 5B.

In the description of the electronic device 200 or 300 including the antenna structure 400 illustrated in FIGS. 3A to 5B, the electronic device 300 is described as a wearable device, but this is only an example and the electronic device 300 is not limited thereto in any of the examples discussed herein.

Figure 6:
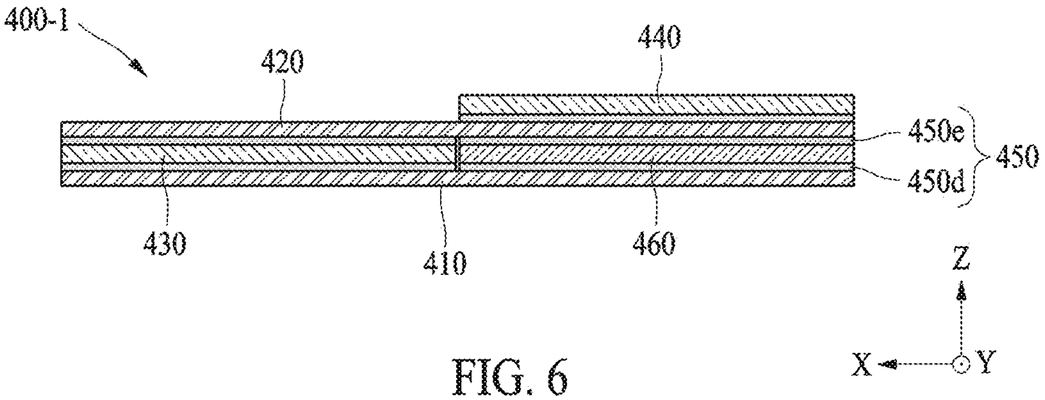
FIG. 6 is a schematic cross-sectional view of an antenna structure according to an embodiment.

FIG. 6 is a schematic cross-sectional view of an antenna structure according to an embodiment.

Referring to FIG. 6, an antenna structure 400-1 according to an embodiment may be applied to the electronic device 101 according to FIG. 1 and/or the electronic device 200 according to FIGS. 2A and 2B. The antenna structure 400-1 according to an embodiment may include a first and second coil such as the WPC coil 410, the NFC coil 420, the first shielding member 430, the second shielding member 440, the adhesive member 450, and/or a non-conductive member 460. In describing the antenna structure 400-1 according to FIG. 6, the same and repetitive description as the corresponding description given with reference to the antenna structure 400, and features thereof, described in FIGS. 3A to 5B is omitted.

In an embodiment, the non-conductive member 460 may be positioned between the WPC coil 410 and the NFC coil 420. At least a portion of the non-conductive member 460 may be overlapped by the second shielding member 440 based on a view of the antenna structure 400-1 from the +z direction. For example, referring to FIG. 6, the first shielding member 430 may be in a left area (e.g., an area in the +x direction) of the WPC coil 410 and the NFC coil 420, and the second shielding member 440 and the non-conductive member 460 may be in a right area (e.g., an area in the −x direction) of the WPC coil 410 and the NFC coil 420. However, this is only an example, and the arrangement of the first shielding member 430, the second shielding member 440, and/or the non-conductive member 460 is not limited thereto.

In an embodiment, the non-conductive member 460 may be formed in the circumferential direction (e.g. so as to have a corresponding circumferential shape to) the WPC coil 410 and/or the NFC coil 420. For example, the non-conductive member 460 may be substantially formed in an arc shape or a fan shape. The non-conductive member 460 may be positioned such that the center of the non-conductive member 460 overlaps the center of the WPC coil 410 and/or the NFC coil 420. For example, the maximum diameter of the non-conductive member 460 may be greater than or equal to the maximum diameter of the WPC coil 410 and/or the NFC coil 420. The minimum diameter of the non-conductive member 460 may be less than or equal to the minimum diameter of the WPC coil 410 and/or the NFC coil 420. However, this is only an example, and the shape of the non-conductive member 460 is not limited thereto.

In an embodiment, the non-conductive member 460 may be attached and fixed to the WPC coil 410 and/or the NFC coil 420. For example, one surface (e.g., a surface in the −z direction) of the non-conductive member 460 may be adhered to the WPC coil 410 by a fourth adhesive member 450*d*. For example, the other surface (e.g., a surface in the +z direction) of the non-conductive member 460 may be attached to the NFC coil 420 by a fifth adhesive member 450*e*. However, this is only an example, and the position of the adhesive member 450 is not limited thereto. For example, the non-conductive member 460 may be attached to a structure other than the WPC coil 410 and the NFC coil 420. In another example, the non-conductive member 460 itself may have an adhesive property and thus may be adhered to the WPC coil 410 and/or the NFC coil 420 without an additional adhesive member.

Figure 7:
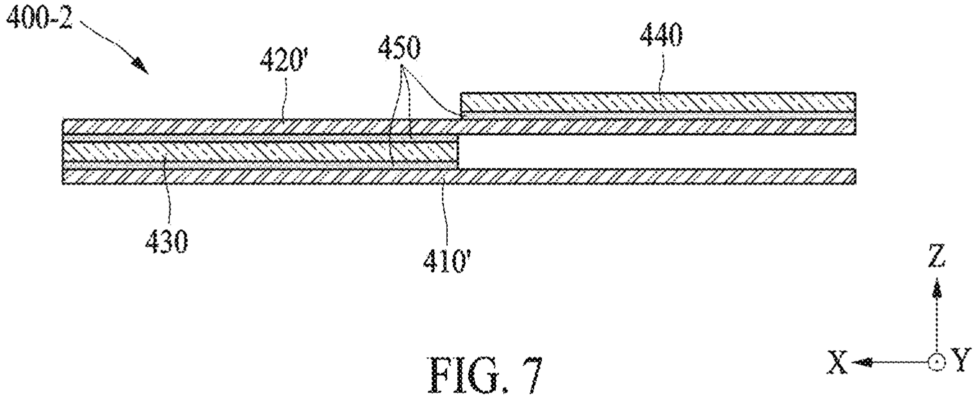
FIG. 7 is a schematic cross-sectional view of an antenna structure according to an embodiment.

In an embodiment, the non-conductive member 460 may be formed of a non-conductive material. The position of the non-conductive member 460 between the WPC coil 410 and the NFC coil 420 may prevent the WPC coil 410 and the NFC coil 420 from contacting each other and thus being short-circuited For example, based on FIG. 6, the non-conductive member 460 may be in a respective right area (e.g., an area in the −x direction) of the WPC coil 410 and the NFC coil 420, so that right areas (e.g., an area in the −x direction) of the WPC coil 410 and the NFC coil 420 do not contact each other, to thus prevent the WPC coil 410 and the NFC coil 420 from being short-circuited. The non-conductive member 460 may function as a spacer maintaining a distance between the WPC coil 410 and the NFC coil 420 at regular intervals. For example, the non-conductive member 460 may have a height (e.g., a height in the z direction) substantially corresponding to that of the first shielding member 430. FIG. 7 is a schematic cross-sectional view of an antenna structure according to an embodiment.

Referring to FIG. 7, an antenna structure 400-2 according to an embodiment may be applied to the electronic device 101 according to FIG. 1 and/or the electronic device 200 according to FIGS. 2A and 2B. The antenna structure 400-2 according to an embodiment may include a first coil 410', a second coil 420', the first shielding member 430, the second shielding member 440, and/or the adhesive member 450. In the description of the antenna structure 400-2 according to FIG. 7, the same descriptions as the descriptions given with reference to antenna structure 400, and features thereof, as described with reference to FIGS. 3A to 5B are omitted.

In an embodiment, referring to FIG. 7, the first coil 410' and the second coil 420' may be any two of a WPC coil, an NFC coil, and an Magnetic Secure Transmission (MST) coil. For example, the first coil 410' may be a WPC coil, and the second coil 420' may be an NFC coil or an MST coil. For example, the first coil 410' may be an NFC coil and the second coil 420' may be a WPC coil or an MST coil. For example, the first coil 410' may be an MST coil and the second coil 420' may be a WPC coil or an NFC coil. The descriptions of the first coil 410 'and the second coil 420' may apply to the descriptions of the WPC coil 410 and the NFC coil 420, respectively, described with reference to FIGS. 3A to 5B to the extent the contents in the descriptions of the first coil 410' and the second coil 420' are not opposed to the contents in the descriptions of the WPC coil 410 and the NFC coil 420.

There now follows a description of a number of paragraphs describing various embodiments of the disclosure. It will be appreciated that the disclosure includes each of these embodiments in isolation, and, even when there is no direct reference between embodiments, also each and every combination of the embodiments (i.e., each and every embodiment formed by combining any two or more of the paragraphs).

In an embodiment, an electronic device 300 may include a housing 310 configured to form an exterior of the electronic device 300 and an antenna structure 400 provided inside the housing 310. The antenna structure 400 may include a first coil 410, an second coil 420 positioned adjacent to the first coil 410 so as to overlap the first coil 410 within an area of the first coil 410, and a first shielding member 430 positioned between the first coil 410 and the second coil 420.

In an embodiment, a center of the first coil 410 may overlap a center of the second coil 420.

In an embodiment, a maximum diameter of the second coil 420 may be less than or equal to a maximum diameter of the first coil 410.

In an embodiment, the first shielding member 430 may be formed along a circumferential direction of the first coil 410 or a circumferential direction of the second coil 420.

In an embodiment, an outer diameter of the first shielding member 430 may be equal to or greater than an outer diameter of the first coil 410 and an outer diameter of the second coil 420.

In an embodiment, an inner diameter of the first shielding member 430 may be equal to or less than an inner diameter of the first coil 410 and an inner diameter of the second coil 420.

In an embodiment, the antenna structure 400 may further include a second shielding member 440, and the second coil 420 may be positioned between the first coil 410 and the second shielding member 440.

In an embodiment, the first shielding member 430 may be positioned so as to not overlap the second shielding member 440.

In an embodiment, the first coil 410 may be positioned closer to a rear surface of the electronic device 300 than the second coil 420.

In an embodiment, the first shielding member 430 and the second shielding member 440 may be arranged to reflect, toward the rear surface of the electronic device 300, a signal emitted from the first coil 410 toward a front surface of the electronic device 300.

In an embodiment, the first shielding member 430 may be arranged to reflect, toward a front surface of the electronic device 300, a signal emitted from the second coil 420 toward the rear surface of the electronic device 300, and the second shielding member 440 may be arranged to reflect, toward the rear surface of the electronic device 300, a signal emitted from the second coil 420 toward the front surface of the electronic device 300.

In an embodiment, the first shielding member 430 and the second shielding member 440 may be formed along a circumferential direction of the first coil 410 or a circumferential direction of the second coil 420.

In an embodiment, an antenna structure 400-1 may further include a non-conductive member 460 positioned between the first coil 410 and the second coil 420 such that at least a portion of the second shielding member 440 overlaps the non-conductive member 460.

In an embodiment, the first shielding member 430 may be adhered to the first coil 410 or the second coil 420 by an adhesive member 450.

In an embodiment, the electronic device 300 may further include a display 330 provided inside the housing 310 and a printed circuit board 360 positioned in a rear direction of the display 330. The antenna structure 400 may be positioned in a rear direction of the printed circuit board 360.

In an embodiment, wherein the first coil 410 and the second coil 420 are any two of a wireless power consortium (WPC) coil, a near field communication (NFC) coil, and a magnetic secure transmission (MST) coil.

In an embodiment, an electronic device 300 may include a housing 310 configured to form an exterior of the electronic device 300 and an antenna structure 400 provided inside the housing 310. The antenna structure 400 may include a WPC coil 410 positioned adjacent to a rear surface of the electronic device 300, an NFC coil 420 positioned in a front direction of the WPC coil 410 to be adjacent to the WPC coil 410 and overlapping the WPC coil 410 within an area of the WPC coil 410, a first shield member 430 positioned between the WPC coil 410 and the NFC coil 420, and a second shielding member 440 positioned in a front direction of the NFC coil 420.

In an embodiment, the first shielding member 430 may not overlap the second shielding member 440.

In an embodiment, the first shielding member 430 and the second shielding member 440 may be formed along a circumferential direction of the WPC coil 410 or a circumferential direction of the NFC coil 420.

In an embodiment, an electronic device 300 may include a housing 310 configured to form an exterior of the electronic device and an antenna structure 400-2 provided inside the housing. The antenna structure 400-2 may include a first coil 410', a second coil 420' positioned adjacent to the first coil 410' to overlap the first coil 410' within an area of the first coil 410', and a first shielding member 430 positioned between the first coil 410' and the second coil 420'. In certain examples, the first coil 410' and the second coil 420' may be any two of a WPC coil 410, an NFC coil 420, and an MST coil.

In an embodiment, the antenna structure 400 may further include a second shielding member 440, and the second coil 420' may be positioned between the first shielding member 430 and the second shielding member 440.

It will be appreciated that any of the above-described embodiments, and their technical features (individually and/ or in combination), may be combined with one another in each and every combination, potentially unless there is a conflict between two embodiments or features. That is, each and every combination of two or more of the above-described embodiments is envisaged and included within the present disclosure. One or more features from any embodiment may be incorporated in any other embodiment, and provide a corresponding 10 advantage or advantages.

What is claimed is:

1. An electronic device comprising:

a housing configured to form an exterior of the electronic device; and an antenna structure provided inside the housing, wherein the antenna structure comprises:

a first coil;

a second coil positioned adjacent to the first coil so as to overlap the first coil within an area of the first coil;

a first shielding member positioned between the first coil and the second coil; and a second shielding member, wherein the second coil is positioned between the first coil and the second shielding member, and wherein the second shielding member is positioned so as to not overlap the first shielding member.

2. The electronic device of claim 1, wherein a center of the first coil overlaps a center of the second coil.

3. The electronic device of claim 1, wherein a maximum diameter of the second coil is less than or equal to a maximum diameter of the first coil.

4. The electronic device of claim 1, wherein the first shielding member is formed along a circumferential direction of the first coil or a circumferential direction of the second coil.

5. The electronic device of claim 4, wherein an outer diameter of the first shielding member is equal to or greater than an outer diameter of the first coil and an outer diameter of the second coil; and/or wherein an inner diameter of the first shielding member is less than or equal to an inner diameter of the first coil and an inner diameter of the second coil.

6. The electronic device of claim 1, wherein the first coil is positioned closer to a rear surface of the electronic device than the second coil.

7. The electronic device of claim 1, wherein the first shielding member and the second shielding member are arranged to reflect, toward the rear surface of the electronic device, a signal emitted from the first coil toward a front surface of the electronic device.

8. The electronic device of claim 6, wherein the first shielding member is arranged to reflect, toward a front surface of the electronic device, a signal emitted from the second coil toward the rear surface of the electronic device, and the second shielding member is arranged to reflect, toward the rear surface of the electronic device, a signal emitted from the second coil toward the front surface of the electronic device.

9. The electronic device of claim 1, wherein the first shielding member and the second shielding member are formed along a circumferential direction of the first coil or a circumferential direction of the second coil.

10. The electronic device of claim 1, wherein the antenna structure further comprises a non-conductive member positioned between the first coil and the second coil such that at least a portion of the second shielding member overlaps the non-conductive member.

11. The electronic device of claim 1, wherein the first shielding member is adhered to the first coil or the second coil by an adhesive member.

12. The electronic device of claim 1, further comprising:

a display provided inside the housing; and a printed circuit board positioned in a rear direction of the display, wherein the antenna structure is positioned in a rear direction of the printed circuit board.

13. The electronic device of claim 1, wherein the first coil and the second coil are any two of a wireless power consortium (WPC) coil, a near field communication (NFC) coil, and a magnetic secure transmission (MST) coil.

* * * * *